US011546032B2

(12) United States Patent
Zhang et al.

(10) Patent No.: US 11,546,032 B2
(45) Date of Patent: Jan. 3, 2023

(54) BEAM DIRECTION SELECTION FOR TRANSMISSION AND RECEPTION IN FULL DUPLEX OPERATION

(71) Applicant: QUALCOMM Incorporated, San Diego, CA (US)

(72) Inventors: Qian Zhang, Basking Ridge, NJ (US); Yan Zhou, San Diego, CA (US); Junyi Li, Fairless Hills, PA (US); Navid Abedini, Basking Ridge, NJ (US); Kapil Gulati, Belle Mead, NJ (US); Tao Luo, San Diego, CA (US)

(73) Assignee: QUALCOMM incorporated, San Diego, CA (US)

( * ) Notice: Subject to any disclaimer, the term of this patent is extended or adjusted under 35 U.S.C. 154(b) by 0 days.

(21) Appl. No.: 17/376,968

(22) Filed: Jul. 15, 2021

(65) Prior Publication Data

US 2022/0021431 A1  Jan. 20, 2022

Related U.S. Application Data

(60) Provisional application No. 62/705,846, filed on Jul. 17, 2020.

(51) Int. Cl.
*H04B 7/06* (2006.01)
*H04W 16/28* (2009.01)
*H04W 72/08* (2009.01)

(52) U.S. Cl.
CPC ......... *H04B 7/0617* (2013.01); *H04B 7/0632* (2013.01); *H04W 16/28* (2013.01); *H04W 72/082* (2013.01)

(58) Field of Classification Search
CPC .. H04B 7/0617; H04B 7/0632; H04B 7/0695; H04B 7/088; H04W 16/28; H04W 72/082; H04W 76/14
See application file for complete search history.

(56) References Cited

U.S. PATENT DOCUMENTS

| | | | |
|---|---|---|---|
| 2015/0049650 A1* | 2/2015 | Choi ..................... | H04W 36/22 370/278 |
| 2019/0245631 A1* | 8/2019 | Kim ....................... | H04B 15/04 |
| 2022/0232481 A1* | 7/2022 | Kusashima ......... | H04W 52/146 |

* cited by examiner

*Primary Examiner* — David S Huang
(74) *Attorney, Agent, or Firm* — Arun Swain; Harrity & Harrity, LLP

(57) ABSTRACT

Various aspects of the present disclosure generally relate to wireless communication. In some aspects, a first wireless communication device (WCD) may transmit, to a second WCD, information for selecting transmission or reception directions for a first beam and a second beam for communications between the first WCD and the second WCD using a full duplex operation. The WCD may receive an indication to use, for the full duplex operation of the first WCD, the first beam to receive communications and the second beam to transmit communications. Numerous other aspects are provided.

30 Claims, 10 Drawing Sheets

US 11,546,032 B2

BEAM DIRECTION SELECTION FOR TRANSMISSION AND RECEPTION IN FULL DUPLEX OPERATION

CROSS-REFERENCE TO RELATED APPLICATION

This patent application claims priority to Provisional Patent Application No. 62/705,846, filed on Jul. 17, 2020, entitled "BEAM DIRECTION SELECTION FOR TRANSMISSION AND RECEPTION IN FULL DUPLEX OPERATION," and assigned to the assignee hereof. The disclosure of the prior application is considered part of and is incorporated by reference in this patent application.

FIELD OF THE DISCLOSURE

Aspects of the present disclosure generally relate to wireless communication and to techniques and apparatuses for beam direction selection for transmission and reception in full duplex operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first wireless communication device (WCD) includes: transmitting, to a second WCD, information for selecting transmission or reception directions for a first beam and a second beam for communications between the first WCD and the second WCD using a full duplex operation; and receiving an indication to use, for the full duplex operation of the first WCD, the first beam to receive communications and the second beam to transmit communications.

In some aspects, a method of wireless communication performed by a second WCD includes: determining, based at least in part on one or more of a scheduling constraint or a receipt of information for selecting transmission or reception directions, transmission or reception directions for a first beam and a second beam for communications between the second WCD and a first WCD using a full duplex operation; and transmitting, to the first WCD, an indication to use, for the full duplex operation of the first WCD, the first beam to receive communications and the second beam to transmit communications.

In some aspects, a first WCD for wireless communication includes: a memory; and one or more processors coupled to the memory, the memory and the one or more processors configured to: transmit, to a second WCD, information for selecting transmission or reception directions for a first beam and a second beam for communications between the first WCD and the second WCD using a full duplex operation; and receive an indication to use, for the full duplex operation of the first WCD, the first beam to receive communications and the second beam to transmit communications.

In some aspects, a second WCD for wireless communication includes: a memory; and one or more processors coupled to the memory, the memory and the one or more processors configured to: determine, based at least in part on one or more of a scheduling constraint or a receipt of information for selecting transmission or reception directions, transmission or reception directions for a first beam and a second beam for communications between the second WCD and a first WCD using a full duplex operation; and transmit, to the first WCD, an indication to use, for the full duplex operation of the first WCD, the first beam to receive communications and the second beam to transmit communications.

In some aspects, a non-transitory computer-readable medium storing a set of instructions for wireless communication includes: one or more instructions that, when executed by one or more processors of a first WCD, cause the first WCD to: transmit, to a second WCD, information for selecting transmission or reception directions for a first beam and a second beam for communications between the first WCD and the second WCD using a full duplex operation; and receive an indication to use, for the full duplex operation of the first WCD, the first beam to receive communications and the second beam to transmit communications.

In some aspects, a non-transitory computer-readable medium storing a set of instructions for wireless communication includes: one or more instructions that, when executed by one or more processors of a second WCD, cause the second WCD to: determine, based at least in part on one or more of a scheduling constraint or a receipt of information for selecting transmission or reception directions, transmission or reception directions for a first beam and a second beam for communications between the second WCD and a first WCD using a full duplex operation; and transmit, to the first WCD, an indication to use, for the full duplex operation of the first WCD, the first beam to receive communications and the second beam to transmit communications.

In some aspects, an apparatus for wireless communication includes: means for transmitting, to a WCD, information for selecting transmission or reception directions for a first beam and a second beam for communications between the apparatus and the WCD using a full duplex operation; and means for receiving an indication to use, for the full duplex operation of the apparatus, the first beam to receive communications and the second beam to transmit communications.

In some aspects, an apparatus for wireless communication includes: means for determining, based at least in part on one or more of a scheduling constraint or a receipt of information for selecting transmission or reception directions, transmission or reception directions for a first beam and a second beam for communications between the apparatus and a first WCD using a full duplex operation; and means for transmitting, to the first WCD, an indication to use, for the full duplex operation of the first WCD, the first beam to receive communications and the second beam to transmit communications.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
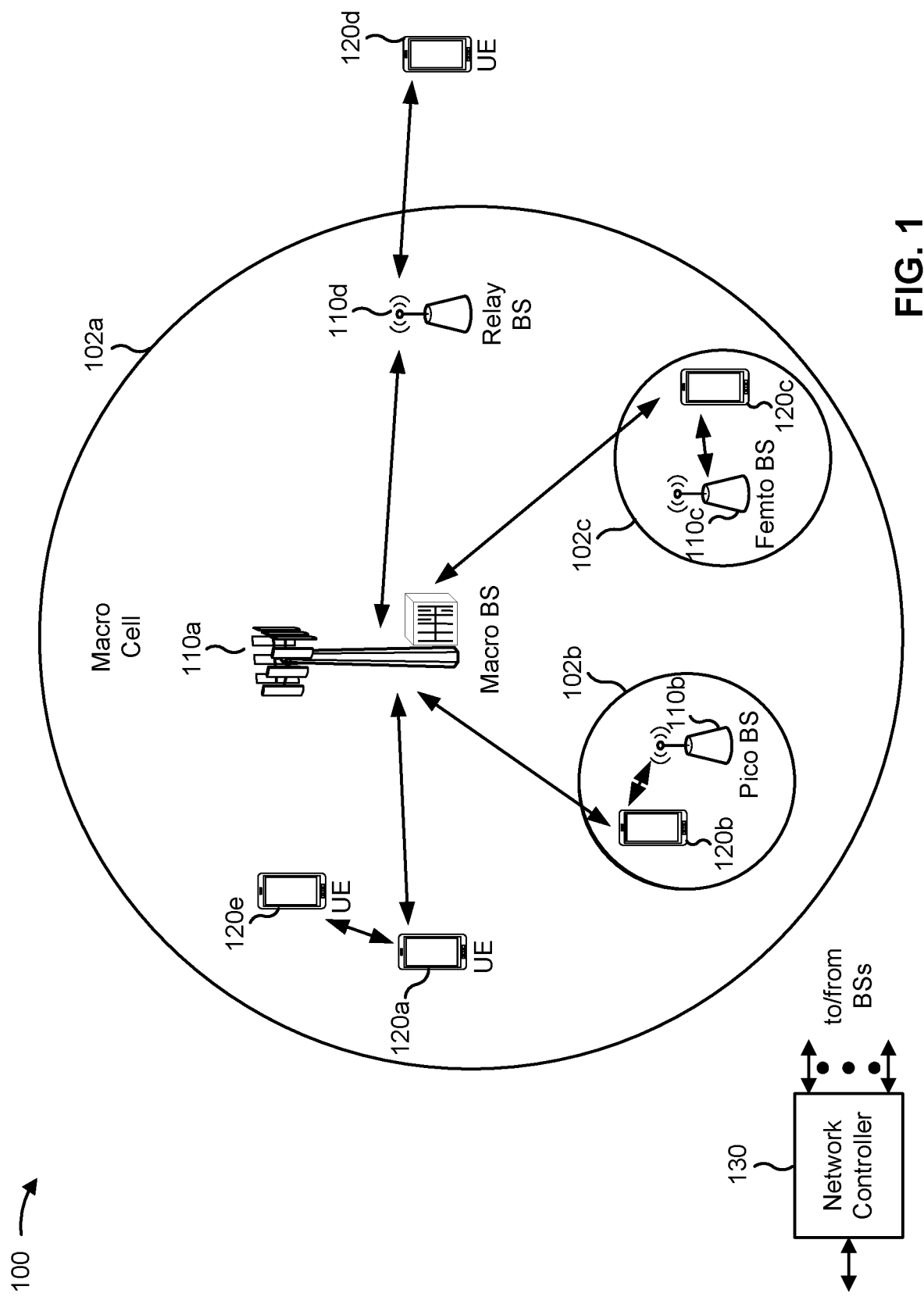
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
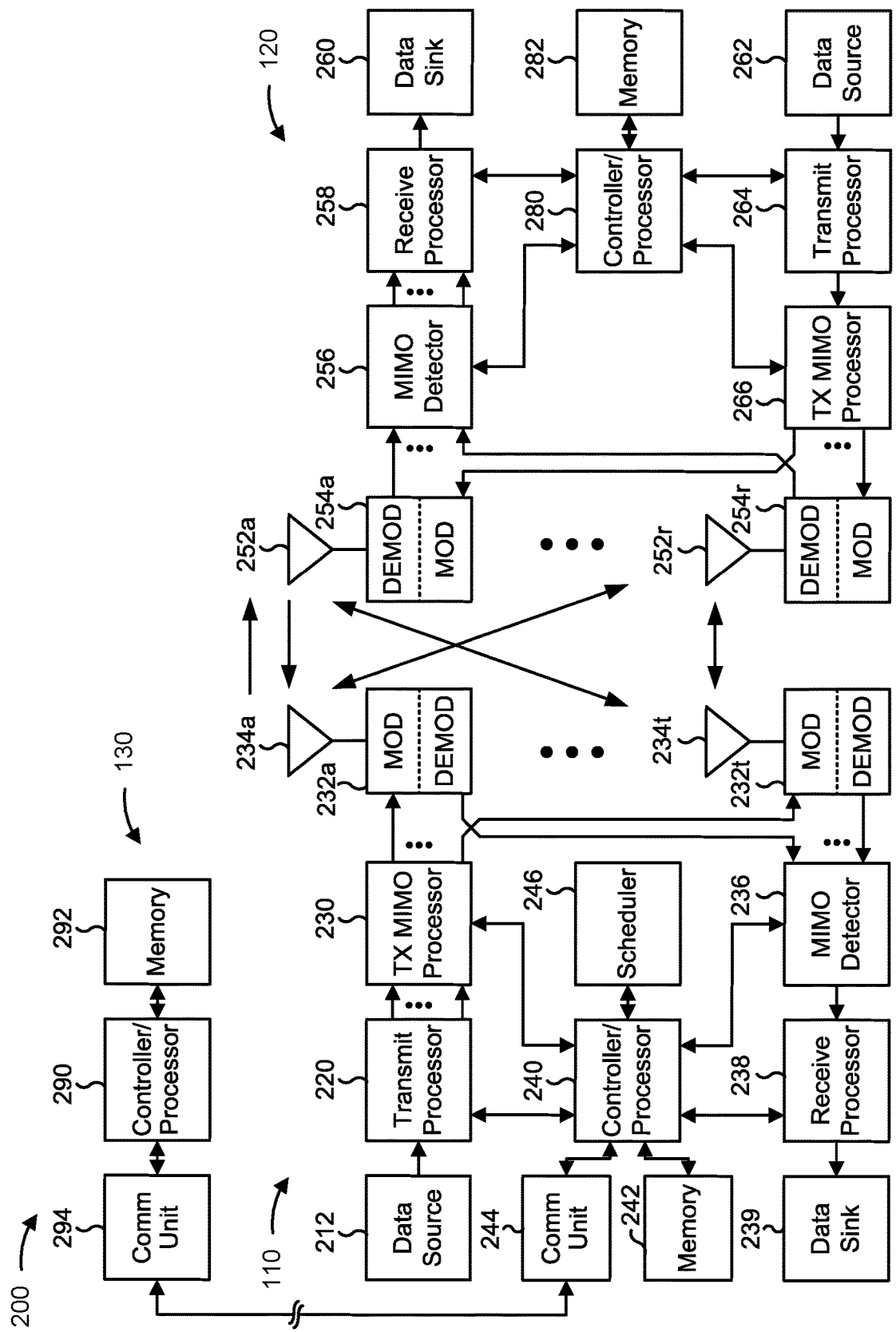
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 4-10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 4-10).

Controller/processor 240 of base station 110, controller/processor 280 of UE 120, and/or any other component(s) of FIG. 2 may perform one or more techniques associated with beam direction selection for transmission and reception in full duplex operation, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a wireless communication device (e.g., UE 120, an integrated access and backhaul (IAB) node, and/or the like) may include means for transmitting, to a second WCD, information for selecting transmission or reception directions for a first beam and a second beam (e.g., previously selected) for communications between the first WCD and the second WCD using a full duplex operation; means for receiving an indication to use, for the full duplex operation of the first WCD, the first beam to receive communications and the second beam to transmit communications; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a wireless communication device (e.g., base station 110, an IAB node, a parent node, a distributed unit, a central unit, and/or the like in an IAB network) may include means for determining, based at least in part on one or more of a scheduling constraint or a receipt of information for selecting transmission or reception directions, transmission or reception directions for a first beam and a second beam (e.g., previously selected) for communications between the second WCD and a first WCD using a full duplex operation; means for transmitting, to the first WCD, an indication to use, for the full duplex operation of the first WCD, the first beam to receive communications and the second beam to transmit communications; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
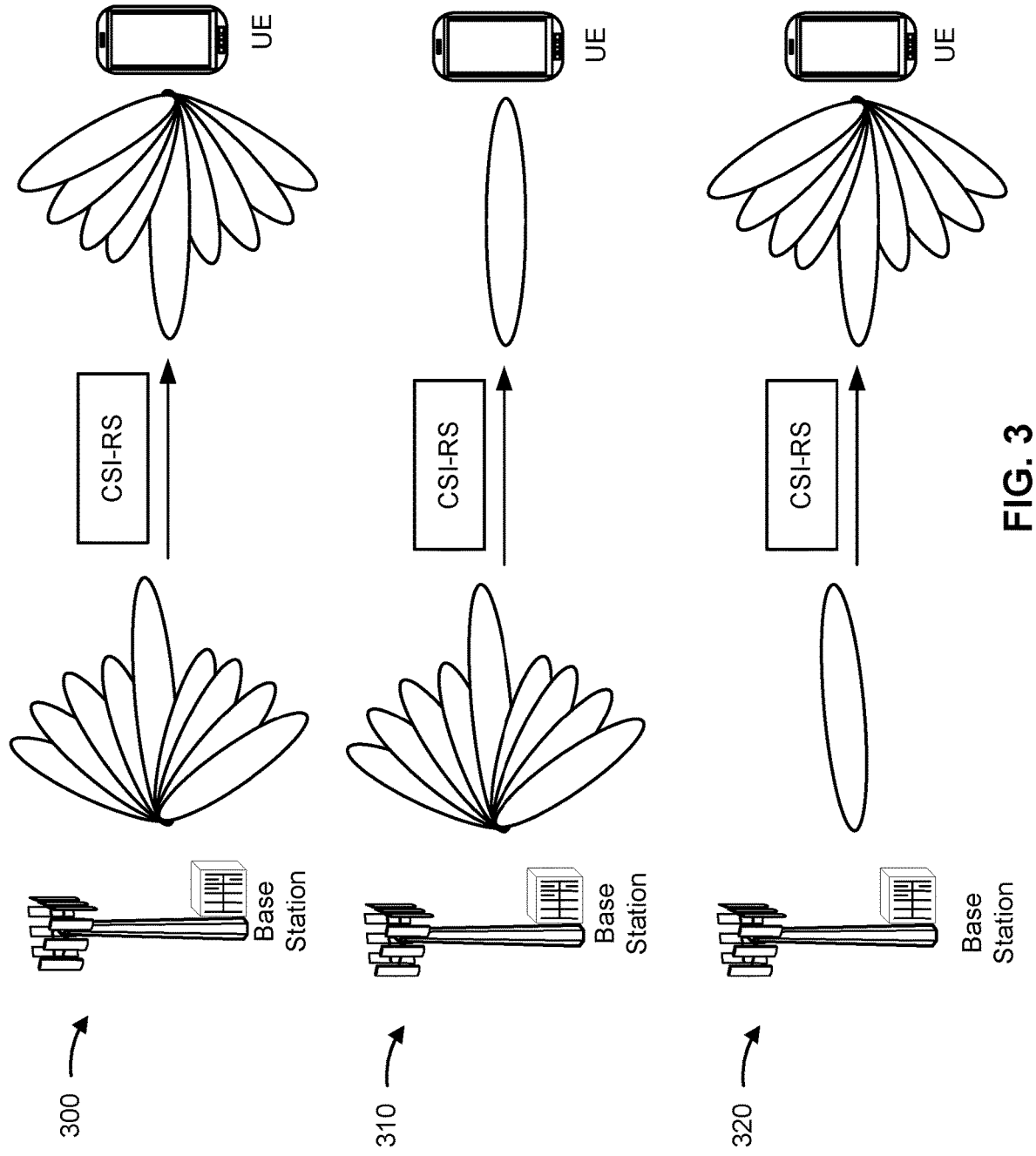
FIG. 3 is a diagram illustrating examples of channel state information reference signal beam management procedures, in accordance with the present disclosure, in accordance with the present disclosure.

FIG. 3 is a diagram illustrating examples 300, 310, and 320 of channel state information (CSI) reference signal (CSI-RS) beam management procedures, in accordance with the present disclosure. As shown in FIG. 3, examples 300, 310, and 320 include a UE in communication with a base station in a wireless network (e.g., wireless network 100). However, the devices shown in FIG. 3 are provided as examples, and the wireless network may support communication and beam management between other devices (e.g., between a UE 120 and a base station 110 or TRP, between a mobile termination node and a control node, between an IAB child node and an IAB parent node, between a scheduled node and a scheduling node, and/or the like). In some aspects, the UE 120 and the base station 110 may be in a connected state (e.g., a radio resource control (RRC) connected state and/or the like).

As shown in FIG. 3, example 300 may include a base station 110 and a UE 120 communicating to perform beam management using CSI-RSs. Example 300 depicts a first beam management procedure (e.g., P1 CSI-RS beam management). The first beam management procedure may be referred to as a beam selection procedure, an initial beam acquisition procedure, a beam sweeping procedure, a cell search procedure, a beam search procedure, and/or the like. As shown in FIG. 3 and example 300, CSI-RSs may be configured to be transmitted from the base station 110 to the UE 120. The CSI-RSs may be configured to be periodic (e.g., using RRC signaling and/or the like), semi-persistent (e.g., using medium access control (MAC) control element (MAC CE) signaling and/or the like), and/or aperiodic (e.g., using downlink control information (DCI) and/or the like).

The first beam management procedure may include the base station 110 performing beam sweeping over multiple transmit (Tx) beams. The base station 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the base station 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the base station 110, the UE 120 may perform beam sweeping through the receive beams of the UE 120. As a result, the first beam management procedure may enable the UE 120 to measure a CSI-RS on different transmit beams using different receive beams to support selection of base station 110 transmit beams/UE 120 receive beam(s) beam pair(s). The UE 120 may report (e.g., in a CSI report) the measurements to the base station 110 to enable the base station 110 to select one or more beam pair(s) for communication between the base station 110 and the UE 120. While example 300 has been described in connection with CSI-RSs, the first beam management process may also use synchronization signal blocks (SSBs) for beam management in a similar manner as described above.

As shown in FIG. 3, example 310 may include a base station 110 and a UE 120 communicating to perform beam management using CSI-RSs. Example 310 depicts a second beam management procedure (e.g., P2 CSI-RS beam management). The second beam management procedure may be referred to as a beam refinement procedure, a base station beam refinement procedure, a TRP beam refinement procedure, a transmit beam refinement procedure, and/or the like. As shown in FIG. 3 and example 310, CSI-RSs may be configured to be transmitted from the base station 110 to the UE 120. The CSI-RSs may be configured to be aperiodic (e.g., using DCI and/or the like). The second beam management procedure may include the base station 110 performing beam sweeping over one or more transmit beams. The one or more transmit beams may be a subset of all transmit beams associated with the base station 110 (e.g., determined based at least in part on measurements reported by the UE 120 in connection with the first beam management procedure). The base station 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the base station 110 to select a best transmit beam based at least in part on measurements of the CSI-RSs (e.g., measured by the UE using the single receive beam) reported by the UE 120.

As shown in FIG. 3, example 320 depicts a third beam management procedure (e.g., P3 CSI-RS beam management). The third beam management procedure may be referred to as a beam refinement procedure, a UE beam refinement procedure, a receive beam refinement procedure, and/or the like. As shown in FIG. 3 and example 320, one or more CSI-RSs may be configured to be transmitted from the base station 110 to the UE 120. The CSI-RSs may be configured to be aperiodic (e.g., using DCI and/or the like). The third beam management process may include the base station 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) the CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the base station 110 and/or the UE 120 to select a best receive beam based at least in part on reported measurements received from the UE 120 (e.g., of the CSI-RS of the transmit beam using the one or more receive beams).

As indicated above, FIG. 3 is provided as an example of beam management procedures. Other examples of beam management procedures may differ from what is described with respect to FIG. 3. For example, the UE and the base station may perform the third beam management procedure before performing the second beam management procedure, the UE and the base station may perform a similar beam management procedure to select a UE transmit beam, and/or the like.

Some UEs and/or base stations may support full duplex operation in which the UEs and/or the base stations support simultaneous transmission and reception. For example, a UE may support transmission via a first beam (e.g., using a first antenna panel) and may simultaneously support reception via a second beam (e.g., using a second antenna panel). Support for simultaneous transmission and reception may be conditional on beam separation, such as spatial separation (e.g., using different beams), frequency separation, and/or the like. Additionally, or alternatively, support for simultaneous transmission may be conditional on using beamforming (e.g., in frequency range 2 (FR2), in frequency range 4 (FR4), for millimeter wave signals, and/or the like).

A base station may select a first beam and a second beam for the UE to use in a full duplex operation (e.g., based at least in part on a beam management procedure). The base station may assign the first beam for the UE to use for reception and the second beam for the UE to use for transmission. The base station may indicate assignments for transmission and reception directions and may begin communicating with the UE based at least in part on the assignments. The base station may assign the first beam for transmission and the second beam for reception based at least in part on a CSI report indicating channel quality without awareness of local conditions of the UE and/or self-interference. This may degrade performance of communicating using the full duplex operation, which may cause communication errors and may consume computing, communication, network, and power resources to detect and/or recover from the communication errors, to communicate using lower modulation and coding schemes (MCS), and/or the like.

In some aspects described herein, a first wireless communication device (WCD) (e.g., UE 120, an IAB node, and/or the like) may transmit information for selecting transmission and/or reception directions for a first beam and a second beam that have been selected as a candidate beam pair for communications between the first WCD and a second WCD (e.g., base station 110, an IAB node, a parent node, a distributed unit, a central unit, and/or the like in an IAB network) using a full duplex operation. The second WCD may receive the information and may determine, based at least in part on the information and/or scheduling constraints, that the first WCD is to use the first beam to receive communications and the second beam to transmit communications. The second WCD may transmit, and the first WCD may receive, an indication to use the first beam to receive communications and the second beam to transmit communications.

In some aspects, the first WCD may transmit the information before initiating the full duplex operation and the indication may indicate to initiate a full duplex operation using the first beam to receive communications and the second beam to transmit communications. In some aspects, the first WCD may transmit the information while operating in the full duplex operation and the indication may indicate to switch a configuration of transmission and/or reception directions while already using the full duplex operation to use the first beam to receive communications and the second beam to transmit communications (e.g., switching away from using the second beam to receive communications and the first beam to transmit communications).

In some aspects, the information may include an indication of requested transmission and reception directions for the first beam and the second beam, a request to switch transmission and reception directions of the first beam and the second beam, and/or the like. In some aspects, the information may include an indication of one or more channel conditions associated with the first beam and the second beam, an indication of one or more local conditions determined by the first WCD, and/or the like.

Based at least in part on the first WCD transmitting the information for selecting transmission or reception directions for the first beam and the second beam (e.g., previously selected) for communications using a full duplex operation, the second WCD may assign the transmission or reception directions with awareness of local conditions of the first WCD and/or channel conditions when using the full duplex operation. This may improve performance of the full duplex operation, which may improve spectral efficiency and lower error rates, which may conserve computing, communication, network, and power resources.

Figure 4:
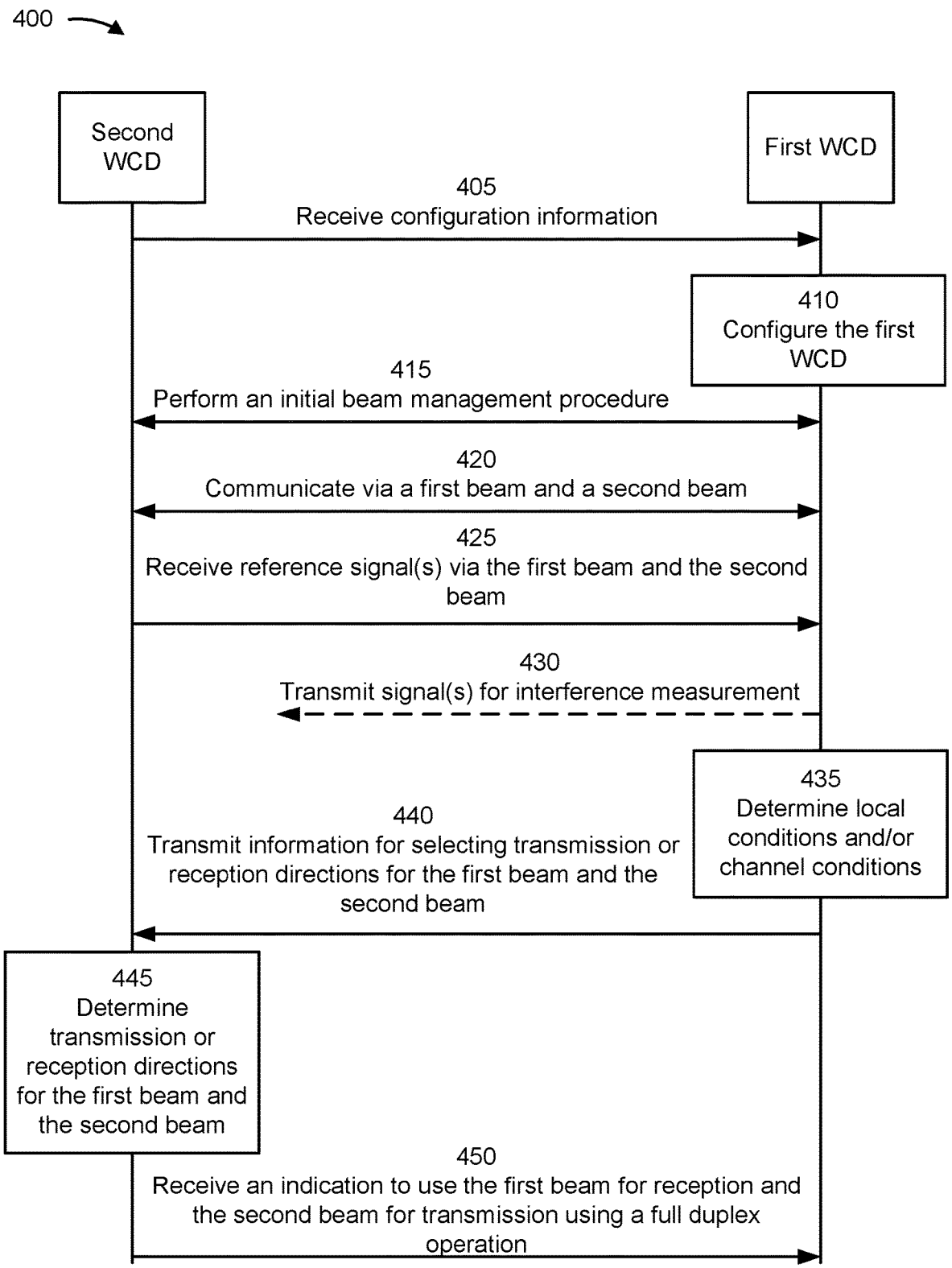
FIGS. 4-8 are diagrams illustrating examples associated with beam direction selection for transmission and reception in full duplex operation, in accordance with the present disclosure.

FIG. 4 is a diagram illustrating an example 400 associated with beam direction selection for transmission and reception in full duplex operation, in accordance with the present disclosure. As shown in FIG. 4, a first WCD (e.g., UE 120, an IAB node, and/or the like) may communicate with a second WCD (e.g., base station 110, an IAB node, a parent node, a distributed unit, a central unit, and/or the like in an IAB network). The first WCD and the second WCD may be part of a wireless network (e.g., wireless network 100). In some aspects, the first WCD and the second WCD may be configured to communicate using millimeter wave signals, beamforming, a full duplex operation, and/or the like.

As shown by reference number 405, the second WCD may transmit, and the first WCD may receive, configuration information. In some aspects, the first WCD may receive the configuration information from another device (e.g., from another WCD and/or the like), from a specification of a communication standard, and/or the like. In some aspects, the first WCD may receive the configuration information via one or more of RRC signaling, medium access control (MAC) signaling (e.g., MAC control elements (MAC CEs)), and/or the like. In some aspects, the configuration information may include an indication of one or more configuration parameters (e.g., already known to the first WCD) for selection by the first WCD, explicit configuration information for the first WCD to use to configure the first WCD, and/or the like.

In some aspects, the configuration information may indicate that the first WCD is to perform one or more beam management procedures, such as a beam selection procedure, to select one or more beams for communicating with the second WCD. In some aspects, the configuration information may indicate that the first WCD is to provide information for selecting transmission or reception directions for beams to be used in a full duplex operation.

As shown by reference number 410, the first WCD may configure the first WCD for communicating with the second WCD. In some aspects, the first WCD may configure the first WCD based at least in part on the configuration information. In some aspects, the first WCD may be configured to perform one or more operations described herein.

As shown by reference number 415, the first WCD and the second WCD may perform an initial beam management procedure. For example, the first WCD may perform a beam selection procedure, the second WCD may perform a beam refinement procedure, the first WCD may perform a beam refinement procedure, and/or the like. Based at least in part on the initial beam management procedure, the first WCD and the second WCD may select a beam pair for communicating. In some aspects, the first WCD and the second WCD may select the beam pair based at least in part on conditions at a time of selection or prior to the time of selection. For example, the first WCD and the second WCD may select the beam pair based at least in part on CSI that is measured and/or reported at the time of selection or prior to the time of selection.

As shown by reference number 420, the first WCD and the second WCD may communicate via a first beam and a second beam using a full duplex operation. For example, the second WCD may select the first beam for the first WCD to use to transmit communications and the second beam for the first WCD to use to receive communications. In some aspects, the second WCD may select transmission or reception directions for the first beam and the second beam based at least in part on CSI that is reported and/or measured at the time of selection of the first beam and the second beam, or prior to the time of selection.

As shown by reference number 425, the first WCD may receive, and the second WCD may transmit, one or more reference signals via the first beam and the second beam. In some aspects, the first WCD may receive the one or more reference signals without first communicating with the second WCD via the first beam and the second beam, as shown with reference to reference number 420.

As shown by reference number 430, the first WCD may transmit one or more signals for interference measurement. For example, the first WCD may transmit one or more signals via the first beam and the second beam to be measured to determine self-interference when receiving reference signals via the second beam and the first beam.

As shown by reference number 435, the first WCD may determine local conditions and/or channel conditions associated with using the first beam and the second beam for the full duplex operation.

In some aspects, the one or more local conditions may include conditions associated with, and/or observed at, the first WCD. In some aspects, the one or more local conditions may include a thermal imbalance between a first antenna array associated with the first beam and a second antenna array associated with the second beam, overheating of the first antenna array or the second antenna array, a maximum permissible exposure event associated with the first antenna array or the second antenna array, and/or the like. For example, the first WCD may determine that a first antenna panel associated with transmitting via the first beam is overheated and/or has a thermal imbalance with a second antenna panel associated with receiving via the second beam. In some aspects, the first WCD may detect a maximum permissible exposure event associated with transmitting via the first beam, which may prevent the first WCD from transmitting via the first beam with sufficient power for communication with the second WCD using current communication parameters. In some aspects, the first WCD may determine that selecting transmission or reception directions of the first beam and the second beam, or switching the transmission or reception directions, may improve communication with the second WCD based at least in part on the one or more local conditions.

In some aspects, the first WCD may determine one or more channel conditions associated with the first beam and the second beam. In some aspects, the WCD may determine the one or more channel conditions based at least in part on receiving the one or more reference signals via the first beam and the second beam, based at least in part on transmitting the signals for the interference measurement, and/or the like. In some aspects, determining the one or more channel conditions may include determining a first signal-to-interference-plus-noise ratio (SINR) for the first beam for transmitting and a second SINR for the second beam for transmitting, determining a first CQI for the first beam for transmitting and a second CQI for the second beam for transmitting, determining a first power headroom for the first beam for transmitting and a second power headroom for the second beam for transmitting, and/or the like.

In some aspects, the first WCD may determine the first SINR based at least in part on a measured signal strength of a first reference signal associated with the first beam (e.g., transmitted by the second WCD and received via the first beam) and a measured self-interference of a first signal transmitted by the first WCD via the second beam and received via the first beam. In some aspects, the first WCD may determine the second SINR based at least in part on a measured signal strength of a second reference signal associated with the second beam (transmitted by the second WCD and received via the second beam) and a measured self-interference of a second signal transmitted by the first WCD via the first beam and received via the second beam.

In some aspects, the first WCD may determine the first CQI based at least in part on a measured signal strength of a first reference signal associated with the first beam (e.g., transmitted by the second WCD and received via the first beam) and a measured self-interference of a first signal transmitted by the first WCD via the second beam and received via the first beam. In some aspects, the first WCD may determine the second CQI based at least in part on a measured signal strength of a second reference signal associated with the second beam (transmitted by the second WCD and received via the second beam) and a measured self-interference of a second signal transmitted by the first WCD via the first beam and received via the second beam.

In some aspects, the first WCD may determine the first power headroom based at least in part on a first self-interference threshold to limit interference from transmissions via the first beam with receptions via the second beam. In some aspects, the first WCD may determine the second power headroom based at least in part on a second self-interference threshold to limit interference from transmissions via the second beam with receptions via the first beam.

As shown by reference number 440, the first WCD may transmit information for selecting transmission or reception directions for the first beam and the second beam (e.g., (e.g., previously selected) for communications between the first WCD and the second WCD using a full duplex operation). In some aspects, the first WCD may transmit the information via one or more of an uplink control information (UCI) message, one or more MAC-CEs, RRC signaling, and/or the like. For example, the first WCD may transmit the information within a CSI report via a UCI message, one or more MAC-CEs, RRC signaling, and/or the like.

In some aspects, the first WCD may determine to transmit the information for selecting transmission or reception directions based at least in part on a request (e.g., from the second WCD) for the information for selecting transmission or reception directions, a process for initiating the full duplex operation, one or more local conditions determined by the first WCD, determining channel conditions associated with the first beam and the second beam, and/or the like.

In some aspects, the information may include an indication of requested transmission and reception directions for the first beam and the second beam, an indication of a request to switch transmission and reception directions of the first beam and the second beam (e.g., switch a current transmission or reception direction of the first beam and the second beam), an indication of one or more channel conditions associated with the first beam and the second beam, an indication of one or more local conditions determined by the first WCD, and/or the like. In some aspects, the information may include indications of one or more channel conditions (e.g., SINR) associated with the first beam, and one or more channel conditions (e.g., SINR) associated with the second beam. For example, the information may include SINR for reception via the first beam when transmitting via the second beam and may include SINR for reception via the second beam when transmitting via the first beam.

In some aspects, the first WCD may transmit the information for selecting transmission or reception directions for the first beam and the second beam as part of a beam selection process (e.g., in connection with performing the initial beam management procedure described in connection with reference number 415). For example, the first WCD may transmit the information before initiating communications via the first beam and the second beam. In some aspects, the first WCD may transmit the information for selecting transmission or reception directions for the first beam and the second beam as a request to change transmission or reception directions from directions previously used and/or configured as part of a beam selection process (e.g., in connection with performing the initial beam management procedure described in connection with reference number 415). For example, the first WCD may transmit the information after communicating via the first beam and the second beam using the first beam for transmission and using the second beam for reception.

As shown by reference number 445, the second WCD may determine transmission or reception directions for the first beam and the second beam. In some aspects, the second WCD may determine the transmission or reception directions for the first beam and the second beam based at least in part on the information for selecting transmission or reception directions. Additionally, or alternatively, the second WCD may determine the transmission or reception directions for the first beam and the second beam based at least in part on a scheduling constraint (e.g., an inability to use one of the first beam or the second beam for a transmission or reception direction based at least in part on transmitting or receive communications with one or more other WCDs).

As shown by reference number 450, the first WCD may receive, and the second WCD may transmit, an indication to use the first beam to receive communications and the second beam to transmit communications using the full duplex operation. In some aspects, the first WCD may receive the indication via RRC signaling, a DCI message, one or more MAC CEs, and/or the like. In some aspects, the indication may include an indication of a transmission configuration indicator (TCI) state or spatial relation information for the first beam and an indication of a TCI state or spatial relation information for the second beam.

In some aspects, the indication may indicate to initiate the full duplex operation with the first beam assigned to receive communications and with the second beam assigned to transmit communications. For example, the indication may be sent without first communicating via the first beam and the second beam as described with reference to reference number 420. In some aspects, the indication may indicate to switch a configuration of the full duplex operation to using the first beam (e.g., from using the second beam or a third beam) to receive communications and to switch to using the second beam (e.g., from using the first beam or a fourth beam) to transmit communications.

In some aspects, the first WCD and the second WCD may communicate based at least part on the indication using the full duplex operation of the first WCD, including receiving one or more communications via the first beam and transmitting one or more communications via the second beam.

Based at least in part on the first WCD transmitting the information for selecting transmission or reception directions for the first beam and the second beam, the second WCD may assign the transmission or reception directions with awareness of local conditions of the first WCD and/or channel conditions when using the full duplex operation. This may improve performance of the full duplex operation, which may improve spectral efficiency and lower error rates, which may conserve computing, communication, network, and power resources.

As indicated above, FIG. 4 is provided as an example. Other examples may differ from what is described with respect to FIG. 4.

Figure 5:
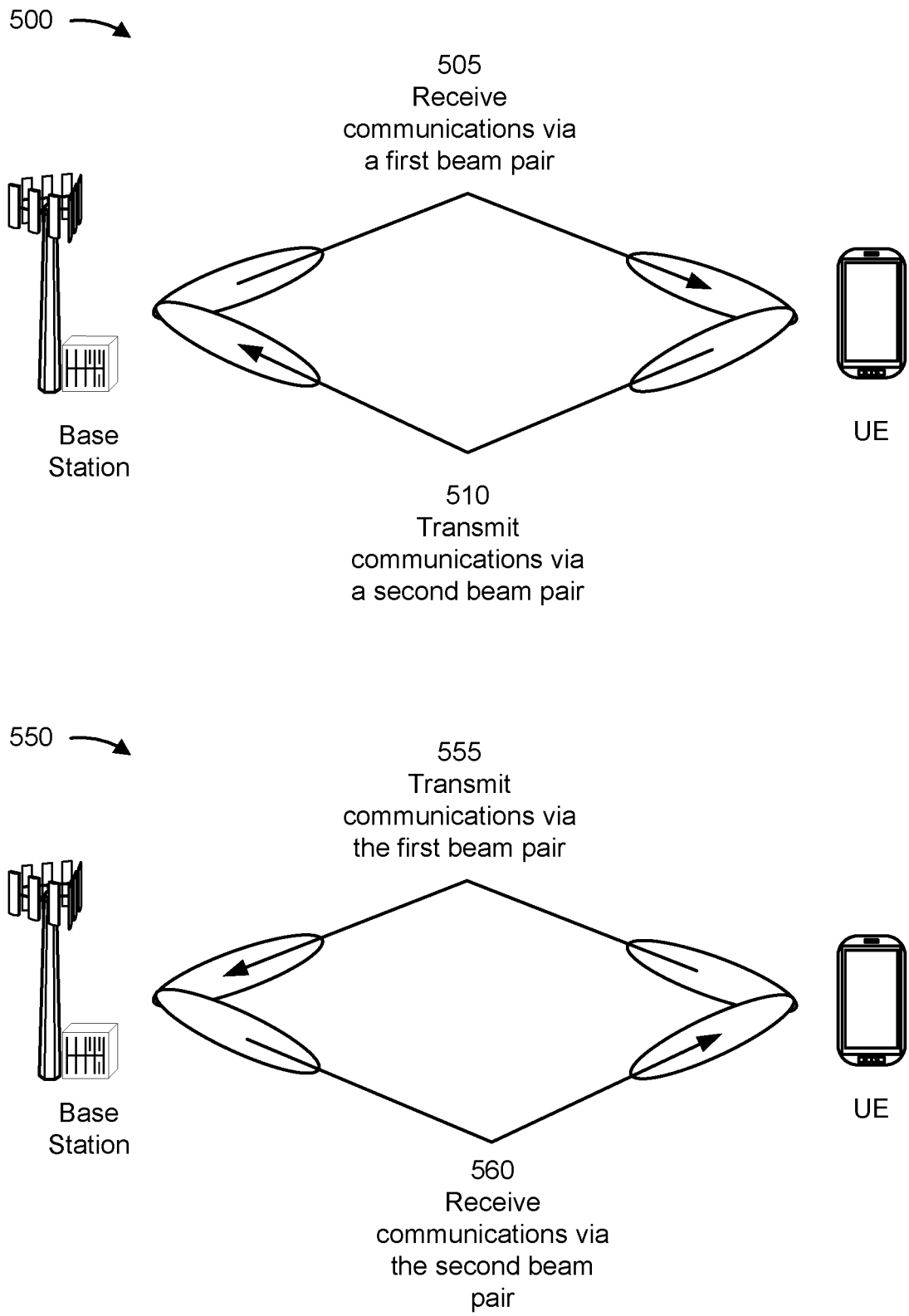

FIG. 5 is a diagram illustrating examples 500 and 550 associated with beam direction selection for transmission and reception in full duplex operation, in accordance with the present disclosure. As shown in FIG. 5, a UE (e.g., UE 120) may communicate with a base station (e.g., base station 110). The UE and the base station may be part of a wireless network (e.g., wireless network 100). In some aspects, the UE and the base station may be configured to communicate using millimeter wave signals, beamforming, a full duplex operation, and/or the like.

As shown by reference number 505, the UE may receive, and the base station may transmit, communication via a first beam pair (e.g., a base station transmit beam and a UE receive beam, a downlink beam pair, and/or the like). As shown by reference number 510, the UE may transmit, and the base station may receive, communications via a second beam pair (e.g., a base station receive beam and a UE transmit beam, an uplink beam pair, and/or the like).

As shown by reference number 555, the UE may transmit, and the base station may receive, communication via the first beam pair (e.g., a base station receive beam and a UE transmit beam, an uplink beam pair, and/or the like). As shown by reference number 560, the UE may receive, and the base station may transmit, communications via the second beam pair (e.g., a base station transmit beam and a UE receive beam, an uplink beam pair, and/or the like).

In some aspects, the UE may determine and/or transmit information for selecting transmission or reception directions for a first beam (e.g., a UE beam of the first beam pair) and a second beam (e.g., a UE beam of the second beam pair). The base station may determine transmission or reception directions for the first beam and the second beam based at least in part on the information and/or scheduling constraints. In some aspects, the base station may determine to operate in a configuration represented by example 500 or example 550 to initiate a full duplex operation. In some aspects, the base station may determine to switch from using the configuration represented by example 500 to using the configuration represented by example 550, or to switch from using the configuration represented by example 500 to using the configuration represented by example 550.

As indicated above, FIG. 5 is provided as an example. Other examples may differ from what is described with respect to FIG. 5.

Figure 6:
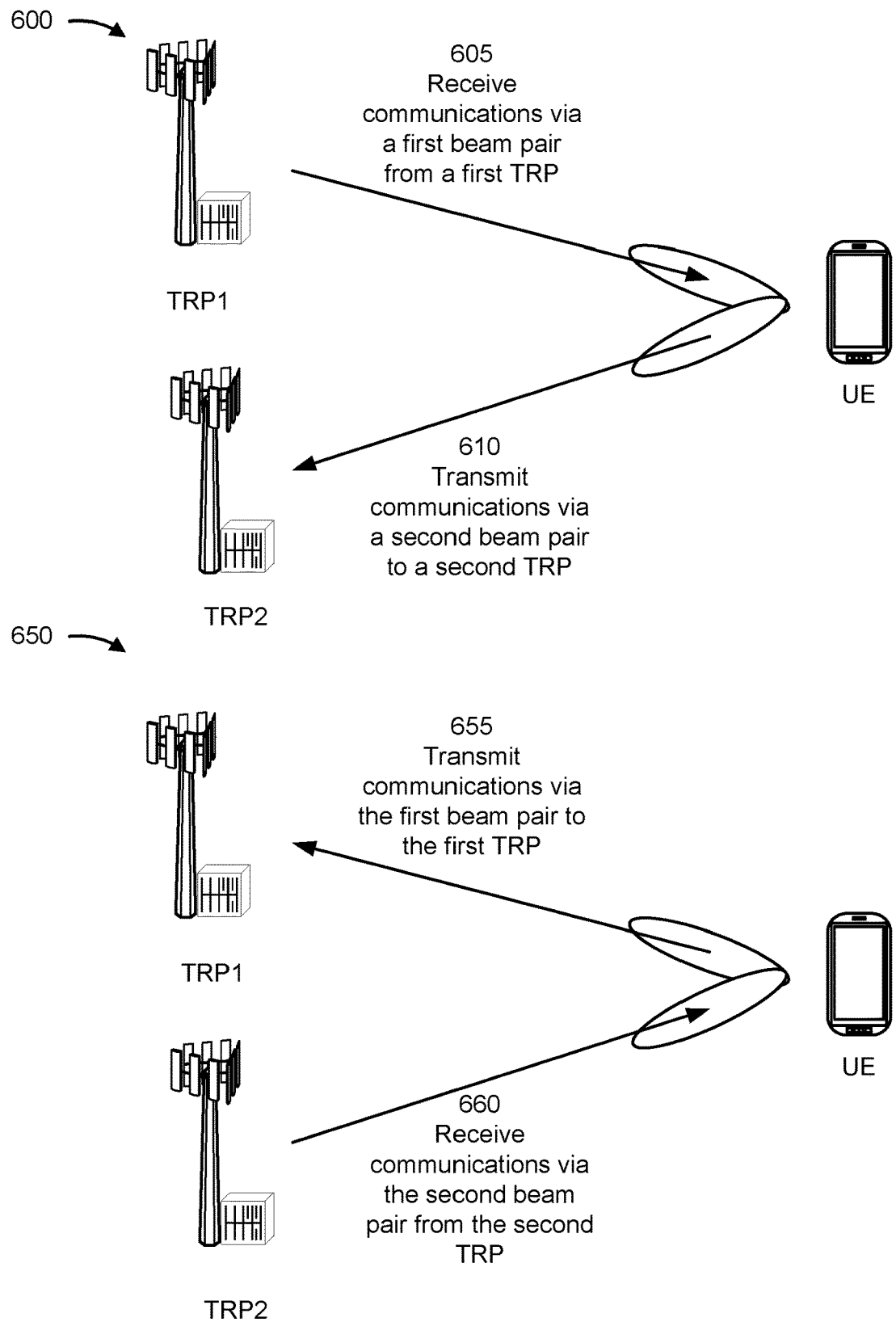

FIG. 6 is a diagram illustrating examples 600 and 650 associated with beam direction selection for transmission and reception in full duplex operation, in accordance with the present disclosure. As shown in FIG. 6, a UE (e.g., UE 120) may communicate with multiple TRPs. The UE and the multiple TRPs (e.g., base stations 110) may be part of a wireless network (e.g., wireless network 100). In some aspects, the UE and the multiple TRPs may be configured to communicate using millimeter wave signals, beamforming, a full duplex operation, and/or the like.

As shown by reference number 605, the UE may receive, and a first TRP (TRP1) may transmit, communications via a first beam pair (e.g., a TRP transmit beam and a UE receive beam, a downlink beam pair, and/or the like). As shown by reference number 610, the UE may transmit, and a second TRP (TRP2) may receive, communications via a second beam pair (e.g., a TRP receive beam and a UE transmit beam, an uplink beam pair, and/or the like).

As shown by reference number 655, the UE may transmit, and the first TRP may receive, communication via the first beam pair (e.g., a TRP receive beam and a UE transmit beam, an uplink beam pair, and/or the like). As shown by reference number 660, the UE may receive, and the second TRP may transmit, communications via the second beam pair (e.g., a TRP transmit beam and a UE receive beam, an uplink beam pair, and/or the like).

In some aspects, the UE may determine and/or transmit information for selecting transmission or reception directions for the first beam (e.g., a UE beam of the first beam pair) and the second beam (e.g., a UE beam of the second beam pair). The first TRP, the second TRP, a base station (e.g., that operates a serving cell that includes the first TRP and the second TRP), and/or the like may determine transmission or reception directions for the first beam pair and the second beam pair based at least in part on the information and/or scheduling constraints. In some aspects, the first TRP, the second TRP, the base station and/or the like may determine to operate in a configuration represented by example 600 or example 650 to initiate a full duplex operation. In some aspects, the first TRP, the second TRP, the base station and/or the like may determine to switch from using the configuration represented by example 600 to using the configuration represented by example 650, or to switch from using the configuration represented by example 650 to using the configuration represented by example 600.

As indicated above, FIG. 6 is provided as an example. Other examples may differ from what is described with respect to FIG. 6.

Figure 7:
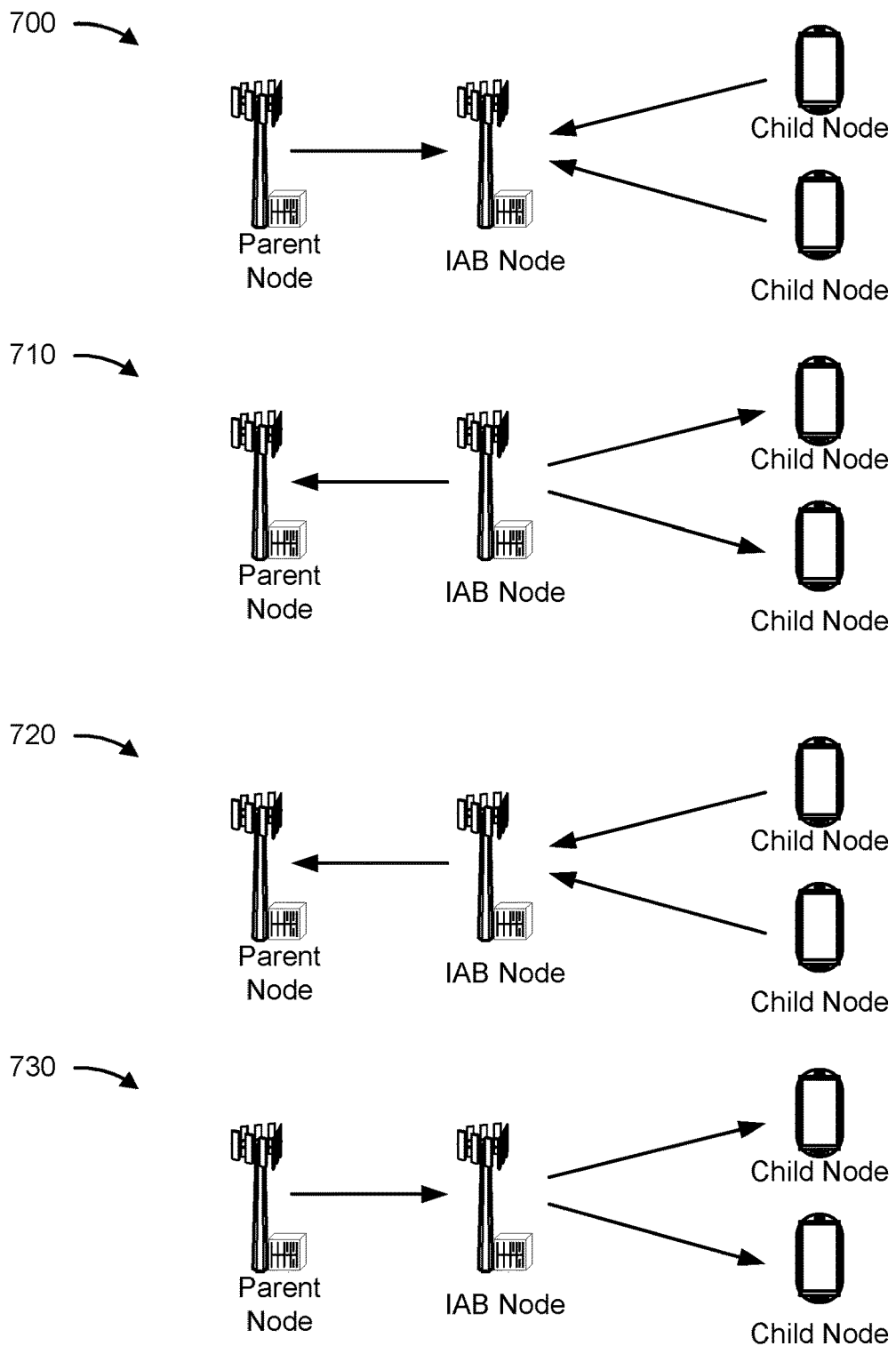

FIG. 7 is a diagram illustrating examples 700, 710, 720, and 730 associated with beam direction selection for transmission and reception in full duplex operation, in accordance with the present disclosure. As shown in FIG. 7, an IAB node (e.g., a base station 110) may communicate with a parent node and multiple child nodes (e.g., base stations 110, UEs 120, and/or the like). The IAB node, the parent node, and the multiple child nodes may be part of a wireless network (e.g., wireless network 100). In some aspects, the IAB node, the parent node, and the multiple child nodes may be configured to communicate using millimeter wave signals, beamforming, a full duplex operation, and/or the like.

As shown by reference number 700 the IAB node may concurrently receive communications (e.g., downlink communications) from the parent node and receive communications (e.g., uplink communications) from the multiple child nodes.

As shown by reference number 710 the IAB node may concurrently transmit communications (e.g., uplink communications) to the parent node and transmit communications (e.g., downlink communications) to the multiple child nodes.

As shown by reference number 720 the IAB node may concurrently transmit communications (e.g., uplink communications) to the parent node and receive communications (e.g., uplink communications) from the multiple child nodes.

As shown by reference number 730 the IAB node may concurrently receive communications (e.g., downlink communications) from the parent node and transmit communications (e.g., downlink communications) to the multiple child nodes.

In some aspects, the IAB node may determine and/or transmit information for selecting transmission or reception directions for a first beam (e.g., a beam for communications between the IAB node and the parent node) and one or more second beams (e.g., one or more beams for communications between the IAB node and the multiple child nodes). The parent node may determine transmission or reception directions for the first beam and the one or more second beams based at least in part on the information and/or scheduling constraints. In some aspects, the parent node may determine to operate in a configuration represented by example 700, example 710, example 720, or example 730 to initiate a full duplex operation of the IAB node. In some aspects, the parent node may determine to switch from using the configuration represented by example 700, example 710, example 720, or example 730 to using a different configuration represented by example 700, example 710, example 720, or example 730.

As indicated above, FIG. 7 is provided as an example. Other examples may differ from what is described with respect to FIG. 7.

Figure 8:
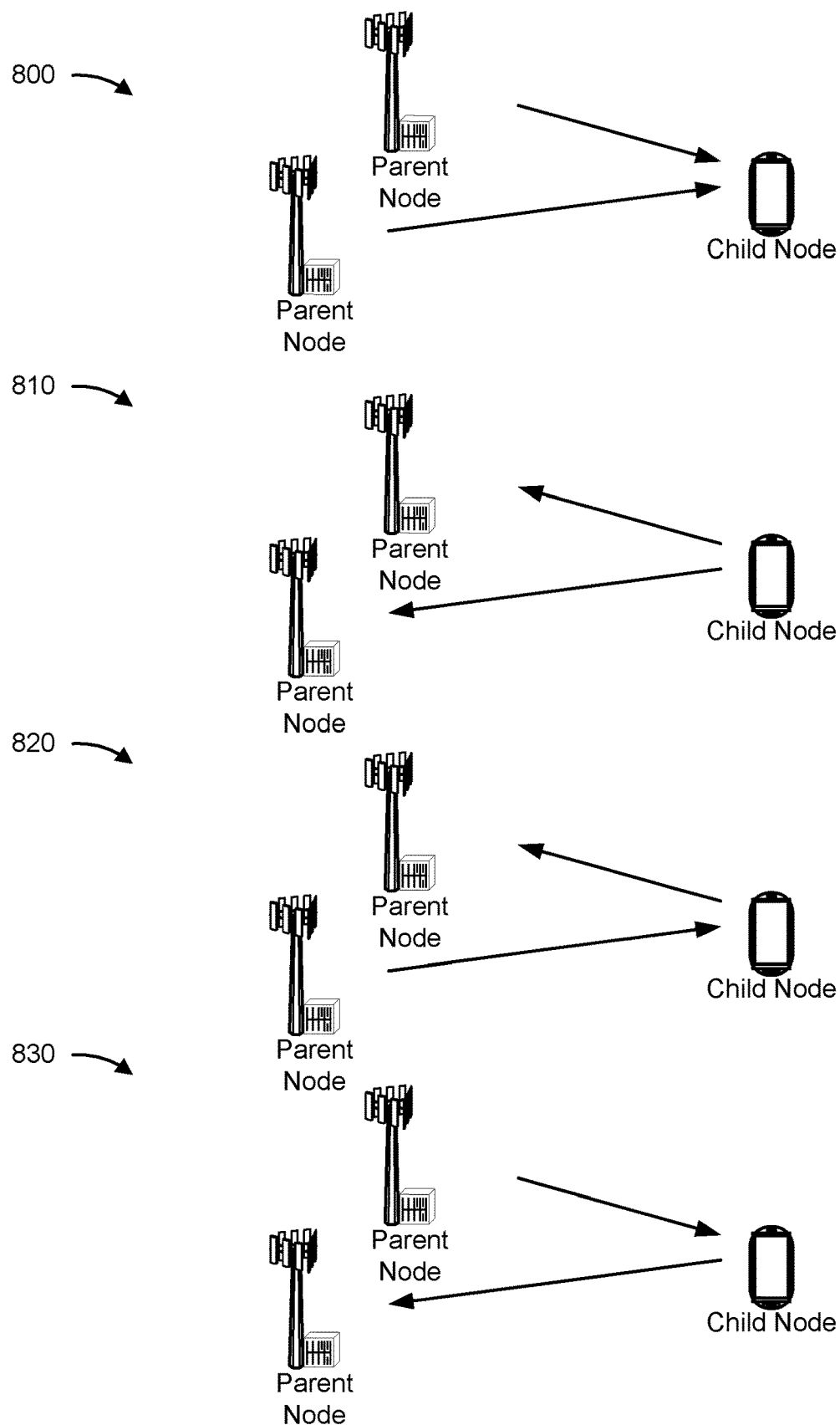

FIG. 8 is a diagram illustrating examples 800, 810, 820, and 830 associated with beam direction selection for transmission and reception in full duplex operation, in accordance with the present disclosure. As shown in FIG. 8, a child node (e.g., a UE 120) may communicate with multiple parent nodes (e.g., base stations 110). The child node and the multiple parent nodes may be part of a wireless network (e.g., wireless network 100). In some aspects, the child node and/or the multiple parent nodes may be IAB nodes. In some aspects, the multiple parent nodes and the child node may be configured to communicate using millimeter wave signals, beamforming, a full duplex operation, and/or the like.

As shown by reference number 800, the child node may concurrently receive communications (e.g., downlink communications) from a first parent node and a second parent node.

As shown by reference number 810, the child node may concurrently transmit communications (e.g., uplink communications) to the first parent node and the second parent node.

As shown by reference number 820, the child node may concurrently transmit communications to the first parent node and receive communications from the second parent node.

As shown by reference number 830, the child node may concurrently receive communications from the first parent node and transmit communications to the second parent node.

In some aspects, the child node may determine and/or transmit information for selecting transmission or reception directions for a first beam (e.g., a beam for communications between the child node and the first parent node) and a second beam (e.g., a beam for communications between the child node and the second parent node). One or more of the multiple parent nodes may determine transmission or reception directions for the first beam and the second beam based at least in part on the information and/or scheduling constraints. In some aspects, the one or more of the multiple parent nodes may determine to operate in a configuration represented by example 800, example 810, example 820, or example 830 to initiate a full duplex operation of the child node. In some aspects, the one or more of the multiple parent nodes may determine to switch from using the configuration represented by example 800, example 810, example 820, or example 830 to using a different configuration represented by example 800, example 810, example 820, or example 830.

As indicated above, FIG. 8 is provided as an example. Other examples may differ from what is described with respect to FIG. 8.

Figure 9:
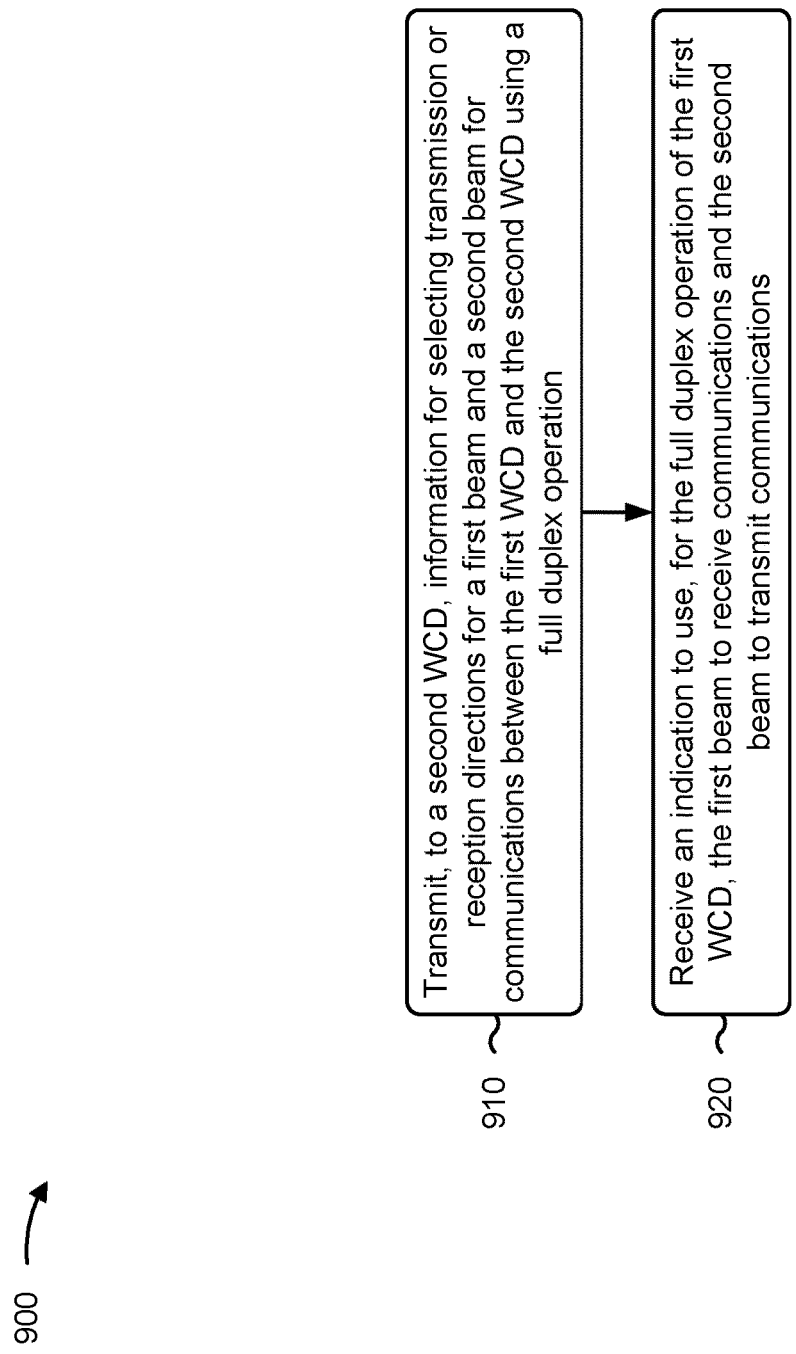
FIGS. 9 and 10 are diagrams illustrating example processes associated with beam direction selection for transmission and reception in full duplex operation, in accordance with the present disclosure.

FIG. 9 is a diagram illustrating an example process 900 performed, for example, by a first WCD, in accordance with the present disclosure. Example process 900 is an example where the first WCD (e.g., UE 120, an IAB node, and/or the like) performs operations associated with beam direction selection for transmission and reception in full duplex operation.

As shown in FIG. 9, in some aspects, process 900 may include transmitting, to a second WCD, information for selecting transmission or reception directions for a first beam and a second beam (e.g., previously selected) for communications between the first WCD and the second WCD using a full duplex operation (block 910). For example, the first WCD (e.g., using controller/processor 280, transmit processor 264, TX MIMO processor 266, MOD 254, antenna 252, and/or the like) may transmit, to a second WCD, information for selecting transmission or reception directions for a first beam and a second beam (e.g., previously selected) for communications between the first WCD and the second WCD using a full duplex operation, as described above.

As further shown in FIG. 9, in some aspects, process 900 may include receiving an indication to use, for the full duplex operation of the first WCD, the first beam to receive communications and the second beam to transmit communications (block 920). For example, the first WCD (e.g., using antenna 252, DEMOD 254, MIMO detector 256, receive processor 258, controller/processor 280, and/or the like) may receive an indication to use, for the full duplex operation of the first WCD, the first beam to receive communications and the second beam to transmit communications, as described above.

Process 900 may include additional aspects, such as any single aspect or any combination of aspects described below and/or in connection with one or more other processes described elsewhere herein.

In a first aspect, process 900 includes determining to transmit the information for selecting transmission or reception directions for the first beam and the second beam based at least in part on one or more local conditions determined by the first WCD.

In a second aspect, alone or in combination with the first aspect, the one or more local conditions determined by the first WCD include one or more of: a thermal imbalance between a first antenna array associated with the first beam and a second antenna array associated with the second beam, overheating of the first antenna array or the second antenna array, or a maximum permissible exposure event associated with the first antenna array or the second antenna array.

In a third aspect, alone or in combination with one or more of the first and second aspects, process 900 includes determining channel conditions associated with the first beam and the second beam, and determining, based at least in part on the channel conditions, to transmit the information for selecting transmission or reception directions for the first beam and the second beam.

In a fourth aspect, alone or in combination with one or more of the first through third aspects, determining the channel conditions associated with the first beam and the second beam includes receiving one or more reference signals via the first beam and the second beam, and determining one or more of a first SINR for the first beam and a second SINR for the second beam, a first CQI for the first beam and a second CQI for the second beam, or a first power headroom for the first beam and a second power headroom for the second beam.

In a fifth aspect, alone or in combination with one or more of the first through fourth aspects, process 900 includes determining the first SINR based at least in part on a measured signal strength of a first reference signal associated with the first beam transmitted by the second WCD and received via the first beam, and a measured self-interference of a first signal transmitted by the first WCD via the second beam and received via the first beam, and determining the second SINR based at least in part on a measured signal strength of a second reference signal associated with the second beam transmitted by the second WCD and received via the second beam, and a measured self-interference of a second signal transmitted by the first WCD via the first beam and received via the second beam.

In a sixth aspect, alone or in combination with one or more of the first through fifth aspects, process 900 includes determining the first CQI based at least in part on a measured signal strength of a first reference signal associated with the first beam transmitted by the second WCD and received via the first beam, and a measured self-interference of a first signal transmitted by the first WCD via the second beam and received via the first beam, and determining the second CQI based at least in part on a measured signal strength of a second reference signal associated with the second beam transmitted by the second WCD and received via the second beam, and a measured self-interference of a second signal transmitted by the first WCD via the first beam and received via the second beam.

In a seventh aspect, alone or in combination with one or more of the first through sixth aspects, process 900 includes determining the first power headroom based at least in part on a first self-interference threshold to limit interference from transmissions via the first beam with receptions via the second beam, and determining the second power headroom based at least in part on a second self-interference threshold to limit interference from transmissions via the second beam with receptions via the first beam.

In an eighth aspect, alone or in combination with one or more of the first through seventh aspects, process 900 includes receiving a request, from the second WCD, for the information for selecting transmission or reception directions for the first beam and the second beam.

In a ninth aspect, alone or in combination with one or more of the first through eighth aspects, the information for selecting transmission or reception directions for the first beam and the second beam includes one or more of an indication of requested transmission and reception directions for the first beam and the second beam, an indication of one or more channel conditions associated with the first beam and the second beam, an indication of one or more local conditions determined by the first WCD, or an indication of a request to switch transmission and reception directions of the first beam and the second beam.

In a tenth aspect, alone or in combination with one or more of the first through ninth aspects, transmitting the information for selecting transmission or reception directions for the first beam and the second beam includes transmitting the information for selecting transmission or reception directions for the first beam and the second beam via one or more of a CSI report, a UCI message, one or more MAC CEs, or RRC signaling.

In an eleventh aspect, alone or in combination with one or more of the first through tenth aspects, the indication to use the first beam to receive communications and the second beam to transmit communications includes an indication to initiate the full duplex operation with the first beam assigned to receive communications and with the second beam assigned to transmit communications, an indication to switch a configuration of the full duplex operation to using the first beam from using the second beam to receive communications and to using the second beam from using the first beam to transmit communications, or an indication to switch a configuration of full duplex operation to using the first beam from using a third beam to receive communications and to using the second beam from using a fourth beam to transmit communications.

In a twelfth aspect, alone or in combination with one or more of the first through eleventh aspects, the indication to use the first beam to receive communications and the second beam to transmit communications includes an indication of a TCI state or spatial relation information for the first beam, and an indication of a TCI state or spatial relation information for the second beam.

In a thirteenth aspect, alone or in combination with one or more of the first through twelfth aspects, receiving the indication to use the first beam to receive communications and the second beam to transmit communications includes receiving the indication to use the first beam to receive communications and the second beam to transmit communications via one or more of RRC signaling, a downlink control information message, or one or more MAC CEs.

In a fourteenth aspect, alone or in combination with one or more of the first through thirteenth aspects, the first WCD includes one or more of a UE, or an IAB node.

In a fifteenth aspect, alone or in combination with one or more of the first through fourteenth aspects, process 900 includes receiving one or more communications via the first beam using the full duplex operation of the first WCD, and transmitting one or more communications via the second beam using the full duplex operation of the first WCD.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
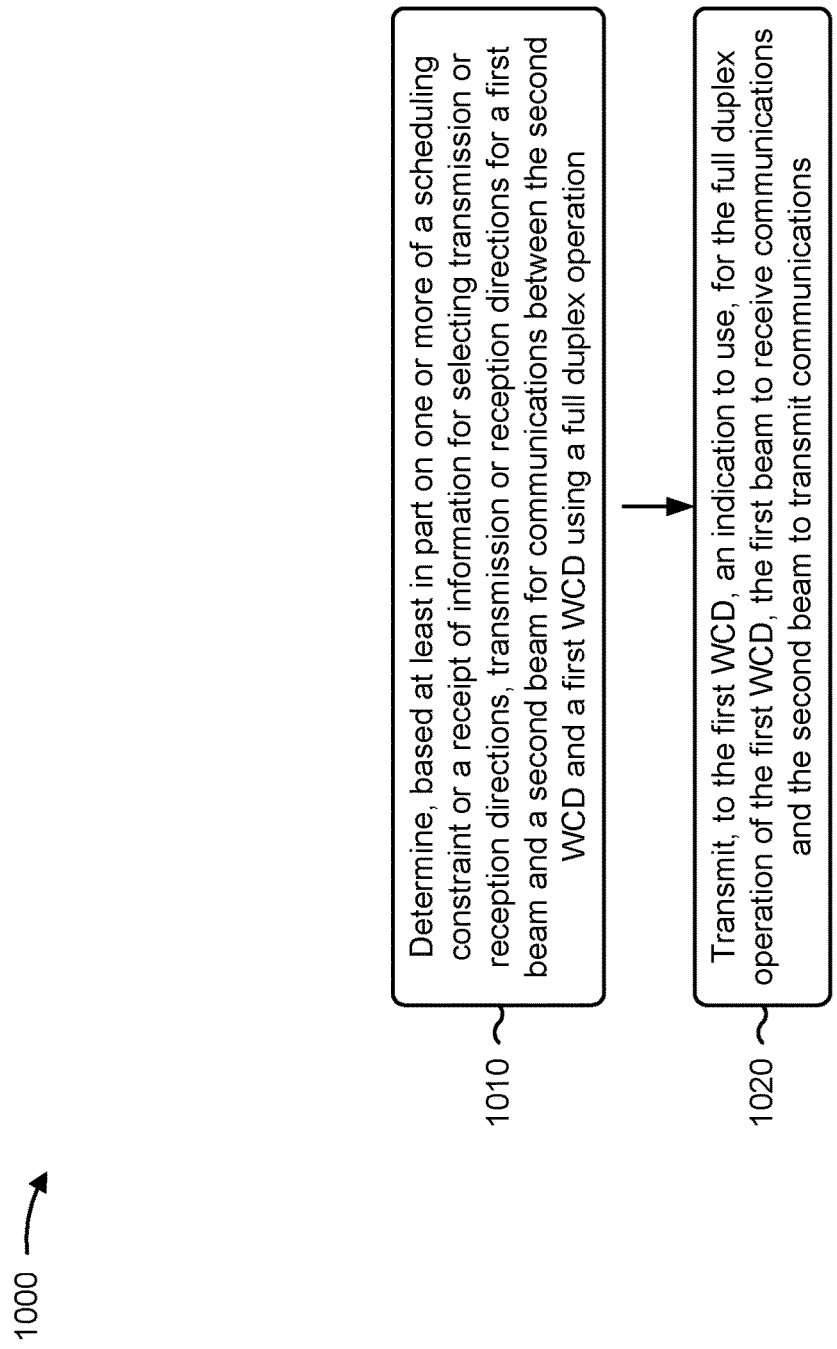

FIG. 10 is a diagram illustrating an example process 1000 performed, for example, by a second WCD, in accordance with the present disclosure. Example process 1000 is an example where the second WCD (e.g., base station 110, an IAB node, a parent node, a distributed unit, a central unit, and/or the like in an IAB network) performs operations associated with beam direction selection for transmission and reception in full duplex operation.

As shown in FIG. 10, in some aspects, process 1000 may include determining, based at least in part on one or more of a scheduling constraint or a receipt of information for selecting transmission or reception directions, transmission or reception directions for a first beam and a second beam (e.g., previously selected) for communications between the second WCD and a first WCD using a full duplex operation (block 1010). For example, the second WCD (e.g., using controller/processor 240 and/or the like) may determine, based at least in part on one or more of a scheduling constraint or a receipt of information for selecting transmission or reception directions, transmission or reception directions for a first beam and a second beam (e.g., previously selected) for communications between the second WCD and a first WCD using a full duplex operation, as described above.

As further shown in FIG. 10, in some aspects, process 1000 may include transmitting, to the first WCD, an indication to use, for the full duplex operation of the first WCD, the first beam to receive communications and the second beam to transmit communications (block 1020). For example, the second WCD (e.g., using controller/processor 240, transmit processor 220, TX MIMO processor 230, MOD 232, antenna 234, and/or the like) may transmit, to the first WCD, an indication to use, for the full duplex operation of the first WCD, the first beam to receive communications and the second beam to transmit communications, as described above.

Process 1000 may include additional aspects, such as any single aspect or any combination of aspects described below and/or in connection with one or more other processes described elsewhere herein.

In a first aspect, the information for selecting transmission or reception directions for the first beam and the second beam includes one or more of an indication of requested transmission and reception directions for the first beam and the second beam, an indication of one or more channel conditions associated with the first beam and the second beam, an indication of one or more local conditions determined by the first WCD, or an indication of a request to switch transmission and reception directions of the first beam and the second beam.

In a second aspect, alone or in combination with the first aspect, the one or more local conditions determined by the first WCD include one or more of a thermal imbalance between a first antenna array associated with the first beam and a second antenna array associated with the second beam, overheating of the first antenna array or the second antenna array, or a maximum permissible exposure event associated with the first antenna array or the second antenna array.

In a third aspect, alone or in combination with one or more of the first and second aspects, the one or more channel conditions associated with the first beam and the second beam include a first SINR for the first beam and a second SINR for the second beam, a first CQI for the first beam and a second CQI for the second beam, or a first power headroom for the first beam and a second power headroom for the second beam.

In a fourth aspect, alone or in combination with one or more of the first through third aspects, the first SINR is based at least in part on a measured signal strength of a first reference signal associated with the first beam transmitted by the second WCD and received via the first beam, and a measured self-interference of a first signal transmitted by the first WCD via the second beam and received via the first beam, and wherein the second SINR is based at least in part on a measured signal strength of a second reference signal associated with the second beam transmitted by the second WCD and received via the second beam, and a measured self-interference of a second signal transmitted by the first WCD via the first beam and received via the second beam.

In a fifth aspect, alone or in combination with one or more of the first through fourth aspects, the first CQI is based at least in part on a measured signal strength of a first reference signal associated with the first beam transmitted by the second WCD and received via the first beam, and a measured self-interference of a first signal transmitted by the first WCD via the second beam and received via the first beam, and wherein the second CQI is based at least in part on a measured signal strength of a second reference signal associated with the second beam transmitted by the second WCD and received via the second beam, and a measured self-interference of a second signal transmitted by the first WCD via the first beam and received via the second beam.

In a sixth aspect, alone or in combination with one or more of the first through fifth aspects, the first power headroom is based at least in part on a first self-interference threshold to limit interference from transmissions via the first beam on receptions by the first WCD via the second beam, and wherein the second power headroom is based at least in part on a second self-interference threshold to limit interference from transmissions via the second beam on receptions by the first WCD via the first beam.

In a seventh aspect, alone or in combination with one or more of the first through sixth aspects, process 1000 includes transmitting one or more reference signals via the first beam and the second beam, and receiving an indication of one or more channel conditions associated with the first beam and the second beam, wherein determining the transmission or reception directions for the first beam and the second beam is based at least in part on the indication of the one or more channel conditions associated with the first beam and the second beam.

In an eighth aspect, alone or in combination with one or more of the first through seventh aspects, process 1000 includes receiving the information for selecting transmission or reception directions for the first beam and the second beam via one or more of a CSI report, a UCI message, one or more MAC CEs, or RRC signaling.

In a ninth aspect, alone or in combination with one or more of the first through eighth aspects, the indication to use the first beam for the first WCD to receive communications and the second beam for the first WCD to transmit communications includes an indication to initiate the full duplex operation with the first beam assigned to receive communications and with the second beam assigned to transmit communications, an indication to switch a configuration of the full duplex operation to using the first beam from using the second beam to receive communications and to using the second beam from using the first beam to transmit communications, or an indication to switch a configuration of full duplex operation to using the first beam from using a third beam to receive communications and to using the second beam from using a fourth beam to transmit communications.

In a tenth aspect, alone or in combination with one or more of the first through ninth aspects, the indication to use the first beam to receive communications and the second beam to transmit communications includes an indication of a TCI state or spatial relation information for the first beam, and an indication of a TCI state or spatial relation information for the second beam.

In an eleventh aspect, alone or in combination with one or more of the first through tenth aspects, transmitting the indication to use the first beam to receive communications and the second beam to transmit communications includes transmitting the indication to use the first beam to receive communications and the second beam to transmit communications via one or more of RRC signaling, a downlink control information message, or one or more MAC CEs.

In a twelfth aspect, alone or in combination with one or more of the first through eleventh aspects, the second WCD includes one or more of a base station, or an IAB node, or a parent node, a distributed unit, or a central unit in an IAB network.

In a thirteenth aspect, alone or in combination with one or more of the first through twelfth aspects, process 1000 includes transmitting one or more communications via the first beam using the full duplex operation of the first WCD, and receiving one or more communications via the second beam using the full duplex operation of the first WCD.

In a fourteenth aspect, alone or in combination with one or more of the first through thirteenth aspects, process 1000 includes transmitting a request for the information for selecting transmission or reception directions for the first beam and the second beam.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a first wireless communication device (WCD), comprising: transmitting, to a second WCD, information for selecting transmission or reception directions for a first beam and a second beam for communications between the first WCD and the second WCD using a full duplex operation; and receiving an indication to use, for the full duplex operation of the first WCD, the first beam to receive communications and the second beam to transmit communications.

Aspect 2: The method of Aspect 1, further comprising: determining to transmit the information for selecting transmission or reception directions for the first beam and the second beam based at least in part on one or more local conditions determined by the first WCD.

Aspect 3: The method of Aspect 2, wherein the one or more local conditions determined by the first WCD comprise one or more of: a thermal imbalance between a first antenna array associated with the first beam and a second antenna array associated with the second beam, overheating of the first antenna array or the second antenna array, or a maximum permissible exposure event associated with the first antenna array or the second antenna array.

Aspect 4: The method of any of Aspects 1-3, further comprising: determining channel conditions associated with the first beam and the second beam, and determining, based at least in part on the channel conditions, to transmit the information for selecting transmission or reception directions for the first beam and the second beam.

Aspect 5: The method of Aspect 4, wherein determining the channel conditions associated with the first beam and the second beam comprises: receiving one or more reference signals via the first beam and the second beam, and determining one or more of: a first signal-to-interference-plus-noise ratio (SINR) for the first beam and a second SINR for the second beam, a first channel quality indicator (CQI) for the first beam and a second CQI for the second beam, or a first power headroom for the first beam and a second power headroom for the second beam.

Aspect 6: The method of Aspect 5, further comprising: determining the first SINR based at least in part on: a measured signal strength of a first reference signal associated with the first beam transmitted by the second WCD and received via the first beam, and a measured self-interference of a first signal transmitted by the first WCD via the second beam and received via the first beam, and determining the second SINR based at least in part on: a measured signal strength of a second reference signal associated with the second beam transmitted by the second WCD and received via the second beam, and a measured self-interference of a second signal transmitted by the first WCD via the first beam and received via the second beam.

Aspect 7: The method of Aspect 5, further comprising: determining the first CQI based at least in part on: a measured signal strength of a first reference signal associated with the first beam transmitted by the second WCD and received via the first beam, and a measured self-interference of a first signal transmitted by the first WCD via the second beam and received via the first beam, and determining the second CQI based at least in part on: a measured signal strength of a second reference signal associated with the second beam transmitted by the second WCD and received via the second beam, and a measured self-interference of a second signal transmitted by the first WCD via the first beam and received via the second beam.

Aspect 8: The method of Aspect 5, further comprising: determining the first power headroom based at least in part on a first self-interference threshold to limit interference from transmissions via the first beam with receptions via the second beam, and determining the second power headroom based at least in part on a second self-interference threshold to limit interference from transmissions via the second beam with receptions via the first beam.

Aspect 9: The method of any of Aspects 1-8, further comprising: receiving a request, from the second WCD, for the information for selecting transmission or reception directions for the first beam and the second beam.

Aspect 10: The method of any of Aspects 1-9, wherein the information for selecting transmission or reception directions for the first beam and the second beam comprises one or more of: an indication of requested transmission and reception directions for the first beam and the second beam, an indication of one or more channel conditions associated with the first beam and the second beam, an indication of one or more local conditions determined by the first WCD, or an indication of a request to switch transmission and reception directions of the first beam and the second beam.

Aspect 11: The method of any of Aspects 1-10, wherein transmitting the information for selecting transmission or reception directions for the first beam and the second beam comprises: transmitting the information for selecting transmission or reception directions for the first beam and the second beam via one or more of: a channel state information report, an uplink control information message, one or more medium-access-control control elements, or radio resource control signaling.

Aspect 12: The method of any of Aspects 1-11, wherein the indication to use the first beam to receive communications and the second beam to transmit communications comprises: an indication to initiate the full duplex operation with the first beam assigned to receive communications and with the second beam assigned to transmit communications, an indication to switch a configuration of the full duplex operation to using the first beam from using the second beam to receive communications and to using the second beam from using the first beam to transmit communications, or an indication to switch a configuration of full duplex operation to using the first beam from using a third beam to receive communications and to using the second beam from using a fourth beam to transmit communications.

Aspect 13: The method of any of Aspects 1-12, wherein the indication to use the first beam to receive communications and the second beam to transmit communications comprises: an indication of a transmission configuration indicator (TCI) state or spatial relation information for the first beam, and an indication of a TCI state or spatial relation information for the second beam.

Aspect 14: The method of any of Aspects 1-13, wherein receiving the indication to use the first beam to receive communications and the second beam to transmit communications comprises: receiving the indication to use the first beam to receive communications and the second beam to transmit communications via one or more of: radio resource control signaling, a downlink control information message, or one or more medium-access-control control elements.

Aspect 15: The method of any of Aspects 1-14, wherein the first WCD comprises one or more of: a user equipment, or an integrated access and backhaul node.

Aspect 16: The method of Aspect 1, further comprising: receiving one or more communications via the first beam using the full duplex operation of the first WCD; and transmitting one or more communications via the second beam using the full duplex operation of the first WCD.

Aspect 17: A method of wireless communication performed by a second wireless communication device (WCD), comprising: determining, based at least in part on one or more of a scheduling constraint or a receipt of information for selecting transmission or reception directions, transmission or reception directions for a first beam and a second beam for communications between the second WCD and a first WCD using a full duplex operation; and transmitting, to the first WCD, an indication to use, for the full duplex operation of the first WCD, the first beam to receive communications and the second beam to transmit communications.

Aspect 18: The method of Aspect 17, wherein the information for selecting transmission or reception directions for the first beam and the second beam comprises one or more of: an indication of requested transmission and reception directions for the first beam and the second beam, an indication of one or more channel conditions associated with the first beam and the second beam, an indication of one or more local conditions determined by the first WCD, or an indication of a request to switch transmission and reception directions of the first beam and the second beam.

Aspect 19: The method of Aspect 18, wherein the one or more local conditions determined by the first WCD comprise one or more of: a thermal imbalance between a first antenna array associated with the first beam and a second antenna array associated with the second beam, overheating of the first antenna array or the second antenna array, or a maximum permissible exposure event associated with the first antenna array or the second antenna array.

Aspect 20: The method of Aspect 18, wherein the one or more channel conditions associated with the first beam and the second beam comprise: a first signal-to-interference-plus-noise ratio (SINR) for the first beam and a second SINR for the second beam, a first channel quality indicator (CQI) for the first beam and a second CQI for the second beam, or a first power headroom for the first beam and a second power headroom for the second beam.

Aspect 21: The method of Aspect 20, wherein the first SINR is based at least in part on a measured signal strength of a first reference signal associated with the first beam transmitted by the second WCD and received via the first beam, and a measured self-interference of a first signal transmitted by the first WCD via the second beam and received via the first beam, and wherein the second SINR is based at least in part on a measured signal strength of a second reference signal associated with the second beam transmitted by the second WCD and received via the second beam, and a measured self-interference of a second signal transmitted by the first WCD via the first beam and received via the second beam.

Aspect 22: The method of Aspect 20, wherein the first CQI is based at least in part on a measured signal strength of a first reference signal associated with the first beam transmitted by the second WCD and received via the first beam, and a measured self-interference of a first signal transmitted by the first WCD via the second beam and received via the first beam, and wherein the second CQI is based at least in part on a measured signal strength of a second reference signal associated with the second beam transmitted by the second WCD and received via the second beam, and a measured self-interference of a second signal transmitted by the first WCD via the first beam and received via the second beam.

Aspect 23: The method of Aspect 20, wherein the first power headroom is based at least in part on a first self-interference threshold to limit interference from transmissions via the first beam on receptions by the first WCD via the second beam, and wherein the second power headroom is based at least in part on a second self-interference threshold to limit interference from transmissions via the second beam on receptions by the first WCD via the first beam.

Aspect 24: The method of any of Aspects 17-23, further comprising: transmitting one or more reference signals via the first beam and the second beam; and receiving an indication of one or more channel conditions associated with the first beam and the second beam, wherein determining the transmission or reception directions for the first beam and the second beam is based at least in part on the indication of the one or more channel conditions associated with the first beam and the second beam.

Aspect 25: The method of any of Aspects 17-24, further comprising: receiving the information for selecting transmission or reception directions for the first beam and the second beam via one or more of: a channel state information report, an uplink control information message, one or more medium-access-control control elements, or radio resource control signaling.

Aspect 26: The method of any of Aspects 17-25, wherein the indication to use the first beam for the first WCD to receive communications and the second beam for the first WCD to transmit communications comprises: an indication to initiate the full duplex operation with the first beam assigned to receive communications and with the second beam assigned to transmit communications, an indication to switch a configuration of the full duplex operation to using the first beam from using the second beam to receive communications and to using the second beam from using the first beam to transmit communications, or an indication to switch a configuration of full duplex operation to using the first beam from using a third beam to receive communications and to using the second beam from using a fourth beam to transmit communications.

Aspect 27: The method of any of Aspects 17-26, wherein the indication to use the first beam to receive communications and the second beam to transmit communications comprises: an indication of a transmission configuration indicator (TCI) state or spatial relation information for the first beam, and an indication of a TCI state or spatial relation information for the second beam.

Aspect 28: The method of any of Aspects 17-27, wherein transmitting the indication to use the first beam to receive communications and the second beam to transmit communications comprises: transmitting the indication to use the first beam to receive communications and the second beam to transmit communications via one or more of: radio resource control signaling, a downlink control information message, or one or more medium-access-control control elements.

Aspect 29: The method of any of Aspects 17-28, wherein the second WCD comprises one or more of: a base station, or an integrated access and backhaul (IAB) node, or a parent node, a distributed unit, or a central unit in an IAB network.

Aspect 30: The method of any of Aspects 17-29, further comprising: transmitting one or more communications via the first beam using the full duplex operation of the first WCD; and receiving one or more communications via the second beam using the full duplex operation of the first WCD.

Aspect 31: The method of any of Aspects 17-30, further comprising: transmitting a request for the information for selecting transmission or reception directions for the first beam and the second beam.

Aspect 32: An apparatus for wireless communication at a device, comprising a processor; memory coupled with the processor; and instructions stored in the memory and executable by the processor to cause the apparatus to perform the method of one or more of Aspects 1-31.

Aspect 33: A device for wireless communication, comprising a memory and one or more processors coupled to the memory, the one or more processors configured to perform the method of one or more of Aspects 1-31.

Aspect 34: An apparatus for wireless communication, comprising at least one means for performing the method of one or more of Aspects 1-31.

Aspect 35: A non-transitory computer-readable medium storing code for wireless communication, the code comprising instructions executable by a processor to perform the method of one or more of Aspects 1-31.

Aspect 36: A non-transitory computer-readable medium storing a set of instructions for wireless communication, the set of instructions comprising one or more instructions that, when executed by one or more processors of a device, cause the device to perform the method of one or more of Aspects 1-31.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first wireless communication device (WCD) for wireless communication, comprising:
 a memory; and
 one or more processors, coupled to the memory, configured to:
  transmit, to a second WCD, information for selecting transmission or reception directions for a first beam and a second beam for communications between the first WCD and the second WCD using a full duplex operation; and
  receive an indication to use, for the full duplex operation of the first WCD, the first beam to receive communications and the second beam to transmit communications.

2. The first WCD of claim 1, wherein the one or more processors are further configured to:
 determine to transmit the information for selecting transmission or reception directions for the first beam and the second beam based at least in part on one or more local conditions determined by the first WCD.

3. The first WCD of claim 2, wherein the one or more local conditions determined by the first WCD comprise one or more of:
 a thermal imbalance between a first antenna array associated with the first beam and a second antenna array associated with the second beam,
 overheating of the first antenna array or the second antenna array, or
 a maximum permissible exposure event associated with the first antenna array or the second antenna array.

4. The first WCD of claim 1, wherein the one or more processors are further configured to:
 determine channel conditions associated with the first beam and the second beam, and
 determine, based at least in part on the channel conditions, to transmit the information for selecting transmission or reception directions for the first beam and the second beam.

5. The first WCD of claim 4, wherein the one or more processors, to determine the channel conditions associated with the first beam and the second beam, are configured to:
 receive one or more reference signals via the first beam and the second beam, and
 determine one or more of:
  a first signal-to-interference-plus-noise ratio (SINR) for the first beam and a second SINR for the second beam,
  a first channel quality indicator (CQI) for the first beam and a second CQI for the second beam, or
  a first power headroom for the first beam and a second power headroom for the second beam.

6. The first WCD of claim 5, wherein the one or more processors are further configured to:
 determine the first SINR based at least in part on:
  a measured signal strength of a first reference signal associated with the first beam transmitted by the second WCD and received via the first beam, and
  a measured self-interference of a first signal transmitted by the first WCD via the second beam and received via the first beam; and
 determine the second SINR based at least in part on:
  a measured signal strength of a second reference signal associated with the second beam transmitted by the second WCD and received via the second beam, and
  a measured self-interference of a second signal transmitted by the first WCD via the first beam and received via the second beam.

7. The first WCD of claim 5, wherein the one or more processors are further configured to:
 determine the first CQI based at least in part on:
  a measured signal strength of a first reference signal associated with the first beam transmitted by the second WCD and received via the first beam, and
  a measured self-interference of a first signal transmitted by the first WCD via the second beam and received via the first beam, and
 determine the second CQI based at least in part on:
  a measured signal strength of a second reference signal associated with the second beam transmitted by the second WCD and received via the second beam, and
  a measured self-interference of a second signal transmitted by the first WCD via the first beam and received via the second beam.

8. The first WCD of claim 5, wherein the one or more processors are further configured to:
 determine the first power headroom based at least in part on a first self-interference threshold to limit interference from transmissions via the first beam with receptions via the second beam; and
 determine the second power headroom based at least in part on a second self-interference threshold to limit interference from transmissions via the second beam with receptions via the first beam.

9. The first WCD of claim 1, wherein the one or more processors are further configured to:
 receive a request, from the second WCD, for the information for selecting transmission or reception directions for the first beam and the second beam.

10. The first WCD of claim 1, wherein the information for selecting transmission or reception directions for the first beam and the second beam comprises one or more of:
 an indication of requested transmission and reception directions for the first beam and the second beam,
 an indication of one or more channel conditions associated with the first beam and the second beam,
 an indication of one or more local conditions determined by the first WCD, or
 an indication of a request to switch transmission and reception directions of the first beam and the second beam.

11. The first WCD of claim 1, wherein the indication to use the first beam to receive communications and the second beam to transmit communications comprises:
an indication to initiate the full duplex operation with the first beam assigned to receive communications and with the second beam assigned to transmit communications,
an indication to switch a configuration of the full duplex operation to using the first beam from using the second beam to receive communications and to using the second beam from using the first beam to transmit communications, or
an indication to switch a configuration of full duplex operation to using the first beam from using a third beam to receive communications and to using the second beam from using a fourth beam to transmit communications.

12. The first WCD of claim 1, wherein the first WCD comprises one or more of:
a user equipment, or
an integrated access and backhaul node.

13. A second wireless communication device (WCD) for wireless communication, comprising:
a memory; and
one or more processors, coupled to the memory, configured to:
determine, based at least in part on one or more of a scheduling constraint or a receipt of information for selecting transmission or reception directions, transmission or reception directions for a first beam and a second beam for communications between the second WCD and a first WCD using a full duplex operation; and
transmit, to the first WCD, an indication to use, for the full duplex operation of the first WCD, the first beam to receive communications and the second beam to transmit communications.

14. The second WCD of claim 13, wherein the information for selecting transmission or reception directions for the first beam and the second beam comprises one or more of:
an indication of requested transmission and reception directions for the first beam and the second beam,
an indication of one or more channel conditions associated with the first beam and the second beam,
an indication of one or more local conditions determined by the first WCD, or
an indication of a request to switch transmission and reception directions of the first beam and the second beam.

15. The second WCD of claim 14, wherein the one or more local conditions determined by the first WCD comprise one or more of:
a thermal imbalance between a first antenna array associated with the first beam and a second antenna array associated with the second beam,
overheating of the first antenna array or the second antenna array, or
a maximum permissible exposure event associated with the first antenna array or the second antenna array.

16. The second WCD of claim 14, wherein the one or more channel conditions associated with the first beam and the second beam comprise:
a first signal-to-interference-plus-noise ratio (SINR) for the first beam and a second SINR for the second beam,
a first channel quality indicator (CQI) for the first beam and a second CQI for the second beam, or
a first power headroom for the first beam and a second power headroom for the second beam.

17. The second WCD of claim 16, wherein the first SINR is based at least in part on a measured signal strength of a first reference signal associated with the first beam transmitted by the second WCD and received via the first beam, and a measured self-interference of a first signal transmitted by the first WCD via the second beam and received via the first beam, and
wherein the second SINR is based at least in part on a measured signal strength of a second reference signal associated with the second beam transmitted by the second WCD and received via the second beam, and a measured self-interference of a second signal transmitted by the first WCD via the first beam and received via the second beam.

18. The second WCD of claim 16, wherein the first CQI is based at least in part on a measured signal strength of a first reference signal associated with the first beam transmitted by the second WCD and received via the first beam, and a measured self-interference of a first signal transmitted by the first WCD via the second beam and received via the first beam, and
wherein the second CQI is based at least in part on a measured signal strength of a second reference signal associated with the second beam transmitted by the second WCD and received via the second beam, and a measured self-interference of a second signal transmitted by the first WCD via the first beam and received via the second beam.

19. The second WCD of claim 16, wherein the first power headroom is based at least in part on a first self-interference threshold to limit interference from transmissions via the first beam on receptions by the first WCD via the second beam, and
wherein the second power headroom is based at least in part on a second self-interference threshold to limit interference from transmissions via the second beam on receptions by the first WCD via the first beam.

20. The second WCD of claim 13, wherein the one or more processors are further configured to:
transmit one or more reference signals via the first beam and the second beam; and
receive an indication of one or more channel conditions associated with the first beam and the second beam,
wherein determining the transmission or reception directions for the first beam and the second beam is based at least in part on the indication of the one or more channel conditions associated with the first beam and the second beam.

21. The second WCD of claim 13, wherein the indication to use the first beam for the first WCD to receive communications and the second beam for the first WCD to transmit communications comprises:
an indication to initiate the full duplex operation with the first beam assigned to receive communications and with the second beam assigned to transmit communications,
an indication to switch a configuration of the full duplex operation to using the first beam from using the second beam to receive communications and to using the second beam from using the first beam to transmit communications, or
an indication to switch a configuration of full duplex operation to using the first beam from using a third beam to receive communications and to using the second beam from using a fourth beam to transmit communications.

22. The second WCD of claim 13, wherein the second WCD comprises one or more of:
   a base station, or
   an integrated access and backhaul (TAB) node, or
      a parent node, a distributed unit, or a central unit in an IAB network.

23. The second WCD of claim 13, wherein the one or more processors are further configured to:
   transmit one or more communications via the first beam using the full duplex operation of the first WCD; and
   receive one or more communications via the second beam using the full duplex operation of the first WCD.

24. The second WCD of claim 13, wherein the one or more processors are further configured to:
   transmit a request for the information for selecting transmission or reception directions for the first beam and the second beam.

25. A method of wireless communication performed by a first wireless communication device (WCD), comprising:
   transmitting, to a second WCD, information for selecting transmission or reception directions for a first beam and a second beam for communications between the first WCD and the second WCD using a full duplex operation; and
   receiving an indication to use, for the full duplex operation of the first WCD, the first beam to receive communications and the second beam to transmit communications.

26. The method of claim 25, further comprising:
   determining to transmit the information for selecting transmission or reception directions for the first beam and the second beam based at least in part on one or more local conditions determined by the first WCD.

27. The method of claim 25, further comprising:
   determining channel conditions associated with the first beam and the second beam; and
   determining, based at least in part on the channel conditions, to transmit the information for selecting transmission or reception directions for the first beam and the second beam.

28. A method of wireless communication performed by a second wireless communication device (WCD), comprising:
   determining, based at least in part on one or more of a scheduling constraint or a receipt of information for selecting transmission or reception directions, transmission or reception directions for a first beam and a second beam for communications between the second WCD and a first WCD using a full duplex operation; and
   transmitting, to the first WCD, an indication to use, for the full duplex operation of the first WCD, the first beam to receive communications and the second beam to transmit communications.

29. The method of claim 28, wherein the information for selecting transmission or reception directions for the first beam and the second beam comprises one or more of:
   an indication of requested transmission and reception directions for the first beam and the second beam,
   an indication of one or more channel conditions associated with the first beam and the second beam,
   an indication of one or more local conditions determined by the first WCD, or
   an indication of a request to switch transmission and reception directions of the first beam and the second beam.

30. The method of claim 28 wherein the indication to use the first beam for the first WCD to receive communications and the second beam for the first WCD to transmit communications comprises:
   an indication to initiate the full duplex operation with the first beam assigned to receive communications and with the second beam assigned to transmit communications,
   an indication to switch a configuration of the full duplex operation to using the first beam from using the second beam to receive communications and to using the second beam from using the first beam to transmit communications, or
   an indication to switch a configuration of full duplex operation to using the first beam from using a third beam to receive communications and to using the second beam from using a fourth beam to transmit communications.

* * * * *